United States Patent
Munson et al.

(10) Patent No.: US 6,542,600 B1
(45) Date of Patent: Apr. 1, 2003

(54) METHOD FOR IMPROVED RESOURCE MANAGEMENT IN A TELECOMMUNICATION APPLICATION PLATFORM

(75) Inventors: Gary A Munson, Little Silver, NJ (US); Peter L. Ng, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/338,131

(22) Filed: Jun. 22, 1999

(51) Int. Cl.$^7$ .................................................. H04M 3/00
(52) U.S. Cl. ........................................ 379/242; 379/229
(58) Field of Search ................................ 379/242, 229, 379/219, 220, 221, 222, 230, 243, 244

(56) References Cited

U.S. PATENT DOCUMENTS 6,324,279 B1 * 11/2001 Kalmanek, Jr. et al. 379/230 X
6,332,023 B1 * 12/2001 Porter et al. ............. 379/229 X

OTHER PUBLICATIONS

Brite Voice Systems, Inc. has certain products that may be relevant to the present invention. Website address: www.brite.com. Attached is product information from Brite's website as of Oct. 18, 1999. Attached Documents: Brite ESP networks (2 pages).

Lucent Technologies, Inc. has a Compact Service Node and Intelligent Peripheral that may be relvante to the present invention. Website address: www.lucent.com. Attached information from Lucent's website as of Oct. 18, 1999. Attached Documents: Compact Service Node and Intelligent Perpheral (3 pages).

* cited by examiner

*Primary Examiner*—Creighton Smith

(57) ABSTRACT

A method for improved resource utilization and increased call completion rates at a telecommunication application platform is disclosed for use in a telecommunication network. The telecommunication application platform includes a plurality of nodes including resource nodes and a global resource manager (GRM). The GRM receives a message identifying an idle communication channel for completing the user's call from a host switch in the telecommunication network. The idle communication channel being connected to a resource node in the application platform. The GRM determines whether the node connected to the idle communication channel has sufficient resources available to complete the call. If sufficient resources are available, the GRM completes the call at the resource node. If sufficient resources are not available at the resource node, the GRM identifies an alternative node to complete the call. If an alternative node is identified, the GRM initiates channel negotiation procedures with the host switch to redirect the call to the alternative node.

35 Claims, 7 Drawing Sheets

FIG. 1B

|  | INSTANCE 1 | INSTANCE 2 | · · · | INSTANCE X |
|---|---|---|---|---|
| RESOURCE TYPE 1 | A/U | A/U | · · · | A/U |
| RESOURCE TYPE 2 | A/U | A/U |  | A/U |
| ⋮ | ⋮ | ⋮ | · · · | ⋮ |
| RESOURCE TYPE K | A/U | A/U |  | A/U |

METHOD FOR IMPROVED RESOURCE MANAGEMENT IN A TELECOMMUNICATION APPLICATION PLATFORM

TECHNICAL FIELD

This invention relates generally to a method for processing telephone calls by a telecommunication application platform having multiple processing nodes and more particularly, to improving platform resource utilization and platform call completion rates.

BACKGROUND OF THE INVENTION

Many telecommunication application platforms employ a modular architecture having multiple processing nodes to support capacity scalability and high service availability. This permits the application platforms to expand and have the capacity to support additional communication traffic. An example of such a platform is an Enhanced Service Provider's platform with multiple PC-based telephony servers. The telephony servers generally interface with a public telecommunication network via a network-platform interface such as, for example, an Integrated Services Digital Network (ISDN) Primary Rate Interface (PRI). An example of such a prior art telecommunication application platform in connection with a public telecommunication network can be seen in FIG. 5. Telecommunication as used herein and in the claims means communication by transmission, emission, or reception of signals by, for example, electrical, radio and/or optical means.

FIG. 5 illustrates a plurality of call processing nodes 510 connected to a telecommunication network 502 via a plurality of PRIs 506-1, 506-2 to 506-N (ISDN equivalent of a T-1 line). A single T-1 line is a high capacity communication channel supporting data rates of up to 1.544 megabits per second (Mbps). A PRI actually consists of 24 individual channels, each of which supports data rates of 64 kilobits per second (Kbps). Each 64 Kbps channel can carry voice or data traffic. ISDN PRI may be configured to provide communication channels (i.e., ISDN PRI B-channels or bearer channels) and signaling channels (i.e., ISDN PRI D-channels) to support communications between a telecommunication application platform 501 and telecommunication network 502. The D-channel provides signaling and control in support of the communications channels.

The plurality of ISDN PRIs 506-1, 506-2 to 506-N may be configured with Non-Facility Associated Signaling (NFAS) capabilities. Thus, the plurality of PRIs, for example, PRIs 506-1, 506-2 to 506-N may be included in the ISDN PRI NFAS group 506. While only three PRIs are illustrated, it is to be understood that the NFAS group 506 may include additional PRIs connecting the telecommunication network 502 with application platform 501. Normally, the PRI D-channel, for example, 506-1a can carry signaling information related to the B-channels in the corresponding PRI 506-1. Using NFAS standards, a plurality of PRIs may be supported with a single D-channel. As a result, D-channel 506-1a, for example, can support the signaling for the entire NFAS group 506.

The telecommunication application platform 501 may include the plurality of call processing nodes, for example, 510-1, 510-2 to 510-N. These nodes may be PC based telephony servers connected to the telecommunication network 502 via a plurality of PRIs 506-1, 506-2 to 506-N, respectively. Each node 510-1, 510-2 to 510-N may contain service logic, a node resource manager, and a pool of system resources (not shown). The service logic can reside on a separate server (not shown) located in platform 501. The service logic may be spread out among a plurality of servers (not shown) and/or nodes 510 in the platform 501.

The platform 501 may include one or more nodes apart from the resource nodes that may include one or more other nodes 504 for, for example, Operations, Administration, Maintenance, and Provisioning (OAM&P), service logic and/or D-channel signaling linked to resource nodes 510 by bus/link 505. The platform 501 may not contain a so-called front-end switch to enable the platform itself to distribute calls among the plurality of resource nodes 510.

Using prior art methods, when user 503 tries to access, for example, an 800 service (toll free service in the United States), an ingress communication switch 507 located in the telecommunication network 502 receives the call. The telecommunication network 502 may include a combination of a local, national, international telecommunication networks and/or any other suitable telecommunication networks. The telecommunication network 502 will generally include a variety of communications equipment to handle incoming and out going communication traffic. For example, the network may include a plurality of communication switches (not shown) such as switches manufactured by Lucent Technologies, Inc., Siemens, or Northern Telecom Ltd. or, depending on the 800 services's choice of the interexchange carrier, any other such suitable switches. The telecommunication network may further include, for example, service processors (not shown) to process the communication traffic. The user's call may traverse a plurality of switches and/or equipment located in the telecommunication network 502 before ending up at, for example, a host switch 513. Host switch 513 can be connected to one or more of the PRIs in the NFAS group 506 servicing the telecommunication application platform 501 of, for example, the desired 800 service. Host switch 513, upon receiving the call, routes the call to the platform 501. As shown in FIG. 5, the 800 service that is desired by the user 503 resides in the platform 501 that is connected to the telecommunication network 502 via a plurality of PRIs 506-1, 506-2 up to 506-N. Thus, the telecommunication application platform 501 serving the 800 service includes a plurality of nodes, for example, nodes 510-1, 510-2 to 510-N. To complete the user's call, host switch 513 will search for an idle B-channel among the plurality of PRI's connecting the telecommunication network 502 with the telecommunication application platform 501. If no idle B-channel is currently available to complete the call, the network provides some kind of call treatment on its own, such as dropping the call, routing the call without providing service features, or sending the call to another application platform elsewhere.

If, however, an idle B-channel is found, the host switch 513 may send an ISDN call set-up message to the platform, over a D-channel 506-1a associated with the idle B-channel in PRI 506-1 associated with the NFAS group 506. Upon receiving the ISDN call set-up message from host switch 513, node 510-1, connected to PRI 506-1, determines whether it has sufficient resources to handle the user's call. A local resource manager (not shown) within the resource node 510-1 receives the call set-up message and makes this determination. The local resource manager of node 510-1 cannot determine the status and/or resource availability of any other resource node in the telecommunication application platform 501. If sufficient system resources are available at node 510-1, that resource node 510-1 will complete the call set-up handshaking with the telecommunication network 502 to accept the call and proceed to process the call. If the local resource manager of node 510-1 determines that sufficient system resources are not available resource 510-1 will reject the call by sending an ISDN release message to the host switch 513. Under current methods, a call will be rejected when the node that is connected to the idle B-channel selected by the network runs out of resources, even if other nodes in the platform may still have available system resources to process the user's call. Thus, current methods are disadvantageous because they are unable to efficiently allocate resources in order to process calls and serve customers in a more effective manner.

Accordingly, what is required is a method for improving resource utilization and allocation in a telecommunication application platform. Specifically, what is required is a dynamic resource management method for locating sufficient resources among a plurality of processing nodes in the entire telecommunication application platform and completing a user's call at a resource node having sufficient resources.

SUMMARY OF THE INVENTION

It is an object of this invention to overcome the deficiencies of the prior art by providing a method for locating sufficient resources among a plurality of processing nodes in the entire telecommunication application platform and completing a user's call at a resource node having sufficient resources. Embodiments of the present invention disclose a method for improved platform resource utilization and increased platform call completion rates.

According to one embodiment of the present invention, a method for more effectively handling calls at a telecommunication application platform is disclosed. The application platform typically includes a plurality of nodes including resource nodes for handling incoming calls from users. The platform is connected to a telecommunication network via a plurality of communications channels and at least one active signaling channel for transporting signaling data. A call is received at a host switch located in the telecommunication network. The host switch determines if an idle communication channel is available for communications with the telecommunication application platform. If an idle communication channel is available, the host switch forwards signaling data including an identifier of the idle communication channel to the application platform. A global resource manager (GRM) within the application platform receives data identifying the idle communications channel for completing the user's call. The GRM determines whether the idle channel node has sufficient resources to complete the call. If sufficient resources are available, the GRM may cause the completion of the call at the idle channel node. If, however, sufficient resources are not available at the idle channel node, the GRM tries to identify an alternative node with sufficient available resources within the same NFAS group. If an alternative node is identified, the GRM causes initiation of channel negotiation procedures with the host switch to redirect the call to an alternative idle communication channel on the alternative node. If the alternative idle channel is acceptable to the host switch, the call may be completed via the alternative idle communication channel.

According to another embodiment of the present invention, a plurality of nodes within the NFAS group of the same D-channel may be connected in a logical ring in the telecommunication application platform. After receiving the call from a user, the telecommunication network may offer the call on an idle communication channel. Upon receiving the signaling data, the idle channel node determines whether it has sufficient resources to complete the call from the user. If it has sufficient resources, the idle channel node will complete the call from the user. If the idle channel node determines that it does not have sufficient resources to complete the call, a resource hunting procedure will be initiated to complete the user's call. The resource hunting procedure comprises the step of forwarding the signaling data to a logically adjacent node. The adjacent node will determine whether it has sufficient resources and an alternative idle communication channel to complete the call. If it does, the logically adjacent node will initiate channel negotiation procedures with the host switch in the telecommunications network to re-direct the call to the adjacent node. On the other hand, if the logically adjacent node does not have the required resources and the alternative idle communication channel, it will forward the signaling data to the logically adjacent node. This resource hunting procedure may continue until a forwarding limit has been reached.

Accordingly, the present invention overcomes the deficiencies of the prior art by providing a method for improving resource utilization and allocation in a telecommunication application platform with multiple processing nodes. The present invention may improve platform resource utilization and increase platform call completion rates.

BRIEF DESCRIPTION OF THE DRAWINGS

The invention will be described in detail herein with reference to the following figures in which like reference numbers refer to the elements, and wherein:

FIG. 1B illustrates a resource instance table in accordance with embodiments of the present invention;

DETAILED DESCRIPTION

Figure 1:
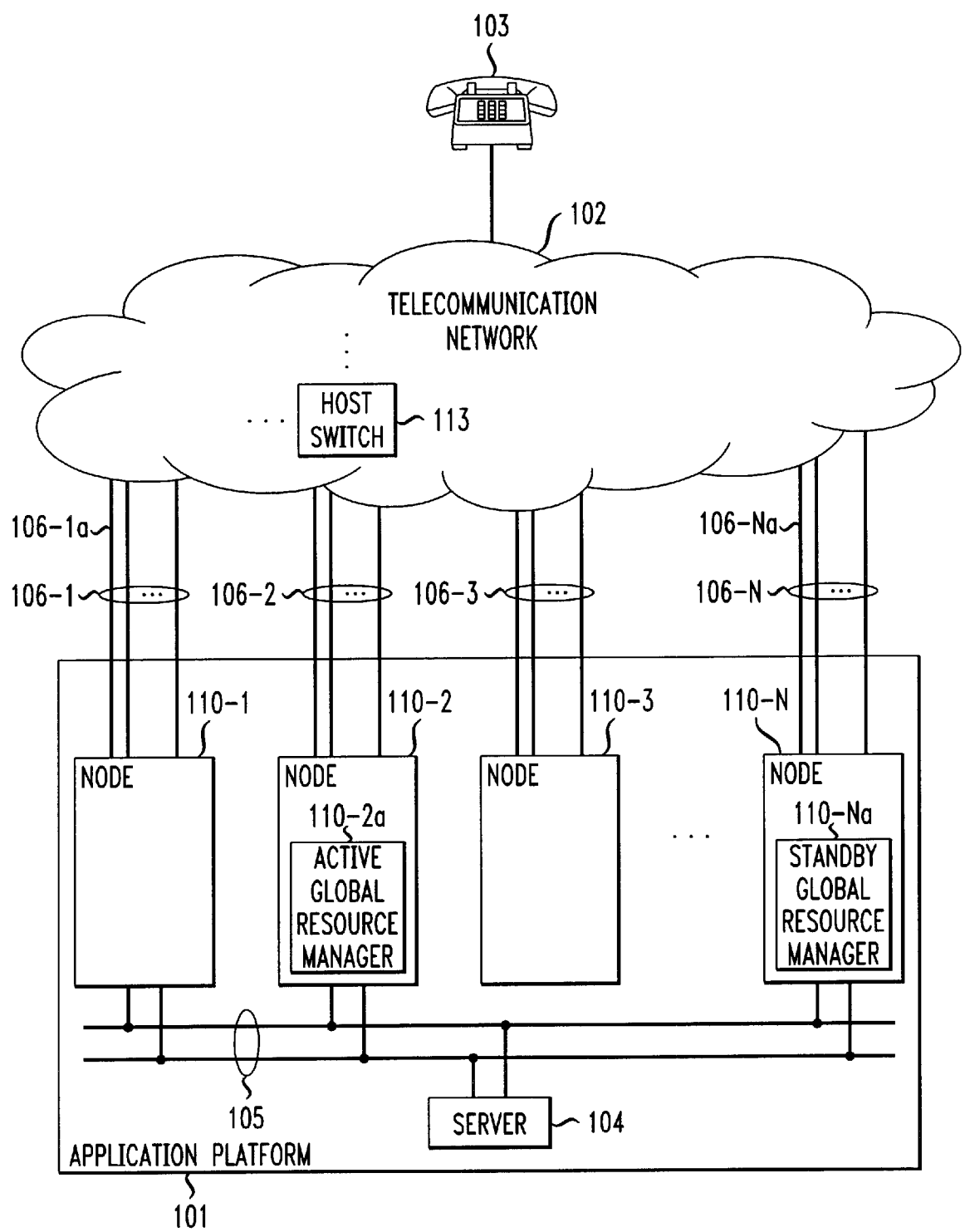
FIG. 1 illustrates a telecommunication application platform having improved resource management capabilities under embodiments of the present invention.

The principles of the present invention are illustrated in several exemplary embodiments, each of which provides a method for improving resource allocation among a plurality of nodes in a telecommunication application platform. Under an exemplary embodiment of the present invention, as shown in FIG. 1, user 103 tries to access one of a plurality of available services. These services may include, for example, toll free service calls, 900 services (for which the caller is charged) or any other suitable services available to user 103. Although a telephone is illustrated in FIG. 1, it is understood that the user 103 may access the desired service via, for example, a plain old telephone service (POTS) call or via a cellular phone call, a data call, a multimedia call or digitized voice call or a personal communication service (PCS) call or call via the Internet. In addition, user 103 may be, for example, a programmable device that initiates the call automatically. Regardless of how the user 103 accesses the desired service, the user may likely be connected to, for example, a telecommunication network 102 as further shown in FIG. 1. The telecommunication network 102 may include a combination of a local, national, international telecommunication networks and/or any other suitable telecommunication networks. The telecommunication network 102 may generally include a variety of communications equipment to handle incoming and outgoing communication traffic. The user's call may traverse a plurality of switches and/or equipment located in the telecommunication network 102 before ending up, for example, at a host switch 113. It is to be understood that host switch 113 is given by way of example only and that any other switch that connects to a PRI in the NFAS group 106 could be the host switch. Host switch 113 may be connected to one or more of the PRIs in the NFAS group 106 servicing the application platform 101 of, for example, the desired 800 service. Upon receiving the call, host switch 113 preferably routes the call to the application platform 101. As shown in FIG. 1, the 800 service desired by the user 103 may be preferably connected to telecommunication network 102 via a plurality of PRIs 106-1, 106-2, 106-3 up to 106-N.

The application platform 101 serving the 800 service may include a plurality of nodes (for example, nodes 110-1, 110-2, 110-3 to 110-N). The plurality of ISDN PRIs 106-1, 106-2, 106-3 to 106-N may be configured with Non-Facility Associated Signaling (NFAS) capabilities. Thus, the plurality of PRIs (for example, PRIs 106-1, 106-2, 106-3 to 106-N) are preferably included in the ISDN PRI NFAS group 106. NFAS group 106 connects the host switch 113 with the plurality of resource nodes 110 in the telecommunication application platform 101. Using NFAS standards, a plurality of PRIs may be supported with a single D-channel. As a result, D-channel 106-1a, for example, can support the signaling for the entire NFAS group 106. All the channels in the same NFAS group should be connected to the same network host switch. The set of communication channels between the application platform 101 and the host switch may be comprised of multiple NFAS groups, and different NFAS groups could be supported by different host switches. The resource nodes may include, for example, resource nodes 110-1, 110-2, 110-3 to 110-N dedicated to call processing functions located within the telecommunication application platform 101 serving the desired service as well as potentially other services. Resource nodes 110-1, 110-2, 110-3 to 110-N located within the telecommunication application platform 101 may include, for example, PC-based telephony servers for processing incoming voice based calls. In the alternative, resource nodes 110-1, 110-2, 110-3 to 110-N may include Internet servers for handling Internet data traffic or may include any other suitable type of device for routing voice and/or data traffic. The telecommunication application platform 101 may include one or more nodes apart from the resource nodes (for example, a centralized node or server 104 that may have, for example, Operations, Administration, Maintenance, and Provisioning (OAM&P), service logic or D-channel signaling). Thus, upon receiving the call, host switch 113 determines that the user desires access to, for example, an 800 service that is served by the telecommunication network 102 via NFAS group 106. To complete the user's call, host switch 113 searches for an idle communication channel among NFAS group 106.

If an idle B-channel is currently unavailable to complete the user's call, the network 102 may provide some kind of call treatment on its own, such as dropping the call, routing the call without providing service features, or sending the call to another application platform elsewhere. If, however, an idle B-channel is found, the host switch 113 preferably sends signaling data including an ISDN call set-up message, to the application platform 101 to try to complete the call to the idle B-channel. Accordingly, the call completion may be attempted at the resource node connected to the idle B-channel (i.e., the idle channel node). Thus, the idle channel node may be any one of the resource nodes in platform 101 that the host switch 113 determines to have an idle communication channel. For example, resource node 110-1 connected to PRI 106-1 may be determined to be the idle channel node. A signaling channel or D-channel may be utilized to transmit the ISDN call set-up message and any other signaling that may be required for call processing.

As stated earlier, the idle B-channel or communication channel may be any one of the remaining channels within, for example, PRI 106-1 or an idle B-channel within any other PRI connecting the application platform 101 with the telecommunication network 102. Thus, the active D-channel may be located in the PRI other than the PRI having the idle communication or B-channel. For example, the host switch 113 may determine that PRI 106-2 currently has the idle B-channel, but the host switch 113 may send the call set-up message to complete the call via the active D-channel 106-1a, for example, located in PRI 106-1. Although only one D-channel is required for the entire NFAS group 106, alternative embodiments of the present invention may include a standby D-channel, for example, 106-Na in the PRI 106-N, in the event that the active D-channel is unavailable. In the event that the active D-channel is unavailable, the standby D-channel 106-Na may be utilized for signaling purposes for the entire NFAS group 106. Preferably, the standby D-channel 106-Na is located in a PRI other than the PRI having the active D-channel 106-1a.

Embodiments of the present invention include an active-Global Resource Manager (active-GRM) 110-2a residing in the application platform 101. The active-GRM 110-2a may reside in any of the plurality of resource nodes in the application platform 101 or may reside external to the resource nodes. For example, the active-GRM 110-2a may reside in the resource node that connects to the D-channel (i.e., D-channel node) or, in the alternative, may reside in node 110-N or the active GRM may reside in centralized node 104. Under embodiments of the present invention, when entities (for example, the GRM or the D-channel node or other resource nodes or servers) are not in the same node, then these entities may communicate via LAN 105. For illustration purposes only, the active-GRM 110-2a resides in node 110-2, as shown in FIG. 1. The active-GRM 110-2a may perform a plurality of functions; for example, it may keep track of the resource availability status of the system resources in all the resource nodes connected to the NFAS group 106. In addition, the active-GRM 110-2a may also allocate available resources to calls as they are received by the platform 101 so that all incoming calls are addressed.

Embodiments of the present invention may include a standby-GRM 110-Na residing in, for example, node 110-N in application platform 101. Preferably, the standby-GRM 110-Na may reside in any resource node except the resource node having the active-GRM 110-2a, for example, node 110-2. Thus, the standby-GRM 110-Na may reside in resource node 110-N or 110-1 or any other resource in the platform 101 except resource node 110-2. The standby-GRM 110-Na preferably performs all the functions of the active-GRM 110-2a in the event the active-GRM 110-2a is unavailable or otherwise unable to perform its designated functions. The standby-GRM 110-Na may reside at the nodal location of the standby D-channel node 106-Na or may reside in any other resource node. Upon receiving the call setup message from the network host switch 113, the D-channel node (e.g., node 110-1) forwards the relevant content to the active GRM 110-2a.

Upon receiving the ISDN signaling data from the D-channel node 110-1, the active-GRM 110-2a may determine whether the resource node 110-1 that connects to the idle communication channel (i.e., idle channel node 110-1) identified by the signaling data has sufficient available system resources to process the call. Resource nodes process incoming calls based on the requirements of the user 103 and the offered services. Under embodiments of the present invention, resource nodes 110 may contain service logic, a node resource manager, and/or a pool of system resources.

Th pool of system resources may include, for example, auto speech recognition or authentication devices, conference bridges, recording devices, DTMF detectors, announcement systems and/or any other suitable system resources. These system resources are required to provide the appropriate level of services to callers. For example, 8 YY calls may use DTMF detection or simple word recognition resources to allow the caller to input a menu choice selection (e.g., reservations or information) or some personal information (e.g. a PIN or customer ID). In addition, such calls may require use announcement resources to prompt the caller for such information or provide pre-recorded messages. Other types of calls (e.g. calls to plain old telephone service (POTS) numbers or 500 numbers) may also use the similar types of resources to enter, for example, a sub-account billing number to pay for products and or services. Other types of calls may require, for example, bridging resources, additional B-channels for making an outgoing call or supporting a multiparty conference, in-band busy detection resource to allow the call to hairpin through the adjunct and monitor for in-band busy (as well as ring/no answer or out-of-band busy). Other more sophisticated resources may be, for example, text-to-speech resources (e.g., to read stock quotes or weather information or e-mail to the caller), or voice verification resources (e.g., for authenticating a caller using a voiceprint), modem resources for data calls, multi-party conferencing resources and fax store and forward resources, or particular service logic scripts (e.g., to allow a user to check their bank account balance or look up airline fares).

It should be noted that among the plurality of system resources that may be available at each node, some resources may be needed only for a short duration. In other cases, the system resources (such as, for example, auto speech recognition units and/or DTMF receivers) may be required throughout the duration of the call. Due to the high cost of and demand for such system resources, the number of available system resource at a node may be less than the number of B-channels connected to that node. In addition, the resource nodes may be non-homogeneous in that they may have differing numbers and types of resources. Because certain resources may be more expensive than others, only a few nodes may be equipped with such resources, for example, voice verification resources. Thus, it may be desirable to allow these nodes to remain free of communication traffic that can be appropriately served by another node. Because of resource costs and limitations, these resources must be properly allocated for highest efficiency and improved resource management and utilization.

The active-GRM 110-2a monitors the plurality of resource nodes 110 and determines the types of resources that are currently available. In addition, the active-GRM 110-2a determines the resources that may be required to process a particular type of call and matches the call with the resource node having the desired resources.

The active-GRM 110-2a may implement, for example, an initial screening procedure to evaluate the resource requirements of a call and efficiently allocate the call to the resource node that can most efficiently handle the call. This screening procedure may include call classification, node classification and/or other types of classifications to effectively allocate resources. Node classification may be accomplished by the GRM 110-2a based on node features that are determined by the available system resources in the plurality of resource nodes. Call classification may be determined by the GRM 110-2a based on, for example, the called party number, the calling party number, the Automatic Number Identification (ANI) or any other suitable information contained in the signaling data. Accordingly, the GRM 110-2a may, for example, compare call classification with node classification and assign the call to the suitable resource node. For example, if a user 103 desires to access the service of checking their bank account balance and/or other information, DTMF detection and announcement resources at the platform may be required. This service may be implied by the particular called party number (e.g., 123-456-7890) signaled to the platform. The GRM 110-2a may classify the call based on that called party number. Call classification may more generally include a determination of the type of resources that may be required to handle the user's call. Subsequently, the GRM 110-2a classifies the plurality of resource nodes in the application platform based on resource availability and matches call classification with node classification. When a match is found, the GRM 110-2a causes the completion of the call at the matching resource node. The above-described node classification may be advantageous in efficiently allocating calls among the plurality of non-homogeneous resource nodes (i.e., resource nodes with different types and number of resources). Accordingly, the active-GRM 110-2a effectively allocates resource nodes to process calls without over allocating system resources.

Accordingly, the active-GRM 110-2a receives the signaling data and compares resource requirements of the call with the available resources of idle channel node 110-1. If there are sufficient available resources in the idle channel node 110-1, the active-GRM 110-2a causes the return of signaling data to the host switch 113 indicating acceptance of the call on the offered channel. GRM 110-2a or the D-channel node 110-1 may also cause the relay of the signaling data to the service logic in the resource node 110-1 to allow handling of the call.

In the event that the active-GRM 110-2a determines that there are insufficient resources in the idle channel 110-1, the active-GRM 110-2a identifies an alternative resource node to process the call. The active-GRM 110-2a may compare the available resources of the remaining resource nodes with the resources required for the user's call. The active-GRM 110-2a identifies the alternative resource node in the application platform 101 having both an alternative idle communication channel (i.e., B-channel) and sufficient resources to complete the call. If the active-GRM 110-2a is able to identify a suitable alternative resource node, active-GRM 110-2a allocates system resources, including the alternative idle channel, in the alternative node to process the pending call.

Figure 1A:
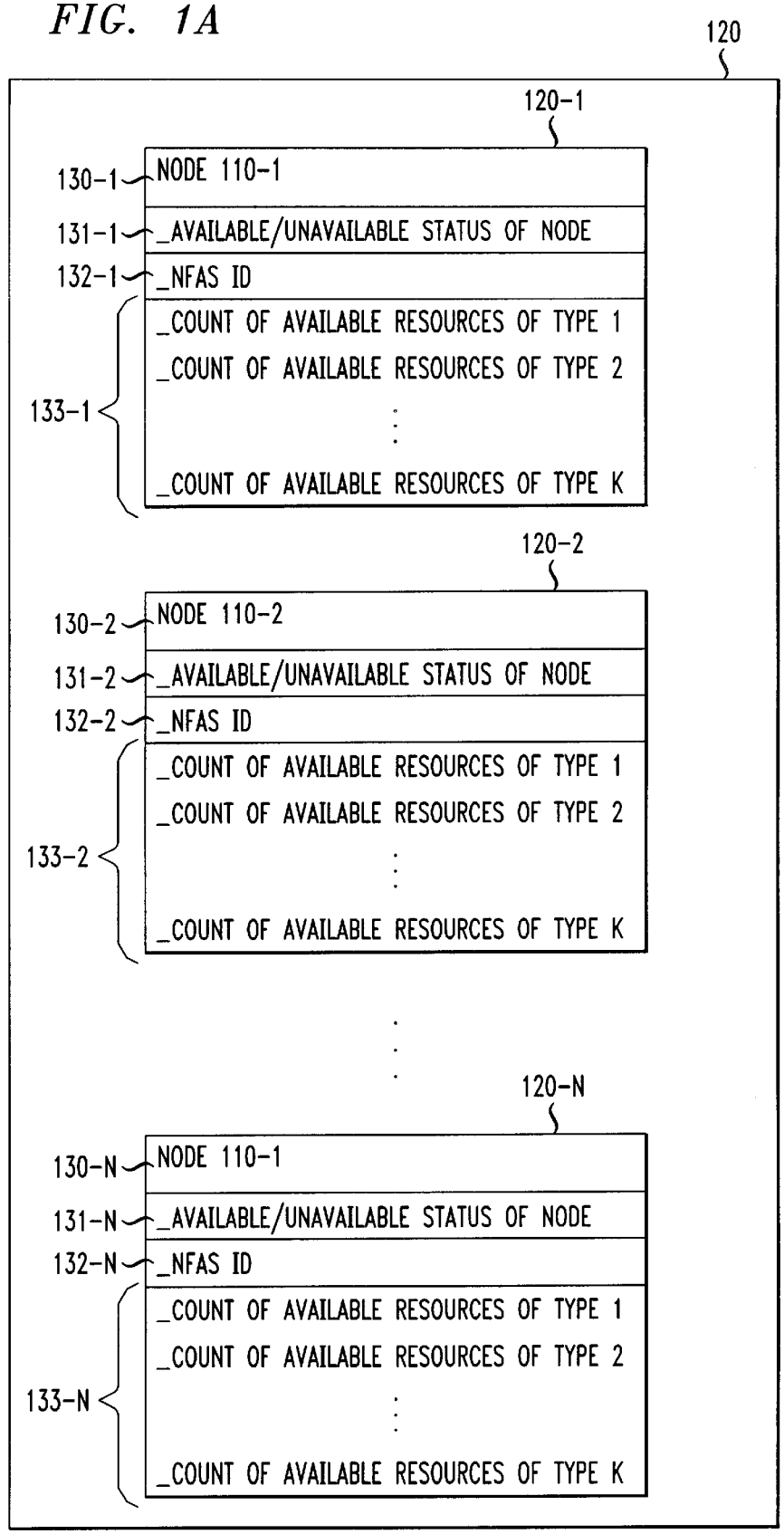
FIG. 1A illustrates a status table in accordance with embodiments of the present invention.

The active-GRM 110-2a, for example, utilizes a status table to maintain the resource allocation and/or availability status for the plurality of resource nodes. The status table permits the active-GRM 110-2a to select a suitable node with resources sufficient to handle a given call. As shown in FIG. 1A, the status table 120 may include, for example, the identity of all resource nodes 110-1 to 110-N in the application platform 101. Status table 120 may include a plurality of sections 120-1 to 120-N for each of the resource nodes 110-1 to 100-N, respectively. Each section may include, for example, the identity of the resource node 130, the individual node availability or unavailability (A/U) status 131 to handle calls, the identity of the NFAS arrangement 132 (i.e., NFAS ID) to which the resource node belongs and/or a count 133 of currently available resources of each type 1 through K within each resource node. Resource types 1 through K may include, for example, B-channels, DTMF detectors, auto speech recognition or authentication devices, conference bridges, recording devices, announcement systems and/or any other suitable system resources. To maintain the status table 120, the active-GRM 110-2a, for example, may periodically poll each of the resource nodes to obtain the desired information and update its status table 120 accordingly. The active-GRM 110-2a may periodically update the status table 120 as resources and communication channels are assigned and released. In alternative embodiments, the plurality of resource nodes 110 may periodically report their resource allocation to the active-GRM 110-2a. In yet other alternative embodiments, as system resources within the nodes become available to devote to new incoming calls, each resource node may indicate its resource availability status to the active-GRM 110-2a.

As shown in FIG. 1B, each resource node in the platform 101 may include a resource instance table 150. The resource instance table 150 may include a list 151 of all the resource types 1 through K available at the particular resource node. and the corresponding availability or unavailability (A/U) status for each instance 152 numbered 1 through X in that node. An instance may be defined as an individual occurrence of the particular type of resource 1 through K in the list 151. For example, if a particular resource node has 48 DTMF detectors, the resource table 150 may maintain the A/U status of each of the 48 DTMF detectors. Thus, there would be instances 1 through 48 for the DTMF resources in that node. The number of instances 152 may vary for each of the particular resource types 1 through K. Thus, if the resource node has 12 speech authentication devices, that resource node would have instances 1 through 12 for that resource type. In alternative embodiments of the present invention, the per-instance information 152 could also be maintained as part of the GRM status table 120.

It is to be understood that the above descriptions related to the status table 120 and the resource instance table 150 are given by way of examples only and any suitable methods may be employed by the GRM and/or resource nodes to maintain the resource availability status of the resource nodes.

The active-GRM 110-2a may further query the resource nodes when a new call comes in, with a list of the resource types needed, to determine which nodes could handle the incoming call. In the event a call only requires a particular resource (for example, an idle B-channel and announcement services) the active-GRM 110-2a may identify a resource with the required criteria and return this information to the appropriate host switch. Regardless of how the status list is maintained and updated, the status list may be kept within the active-GRM 110-2a or may be kept at a remote site where it may be readily accessed and updated by the active-GRM 110-2a. As indicated earlier, the standby-GRM 110-Na, for example, may include all the features and perform all the functions of the active-GRM 110-2a.

Once the alternative resource node and an idle channel on it have been identified by the active-GRM 110-2a, using the PRI channel negotiation procedure described below, the GRM causes signaling to the host switch 113 requesting that the host switch complete the call on that alternative idle channel. If that alternative channel is acceptable to the host switch 113, then the call may be completed.

The ISDN PRI includes a channel negotiation procedure whereby the call can be completed on a B-channel other than the one selected by the host switch. The host switch preferably subscribes to the channel negotiation procedures. When the host switch initially selects an idle channel, the call set-up message to the platform identifying the channel indicates that channel is preferred. The preferred indication informs the platform that it has the option of suggesting an alternative channel to the host switch. If the platform prefers that the call should be completed via the alternative channel, the platform replies to the host switch with the identity of a specific alternative channel. If that alternative channel is acceptable to the host switch, then the call will be completed over that alternative channel to the platform. The alternative channel may be within the NFAS span of the same D-channel.

Figure 2:
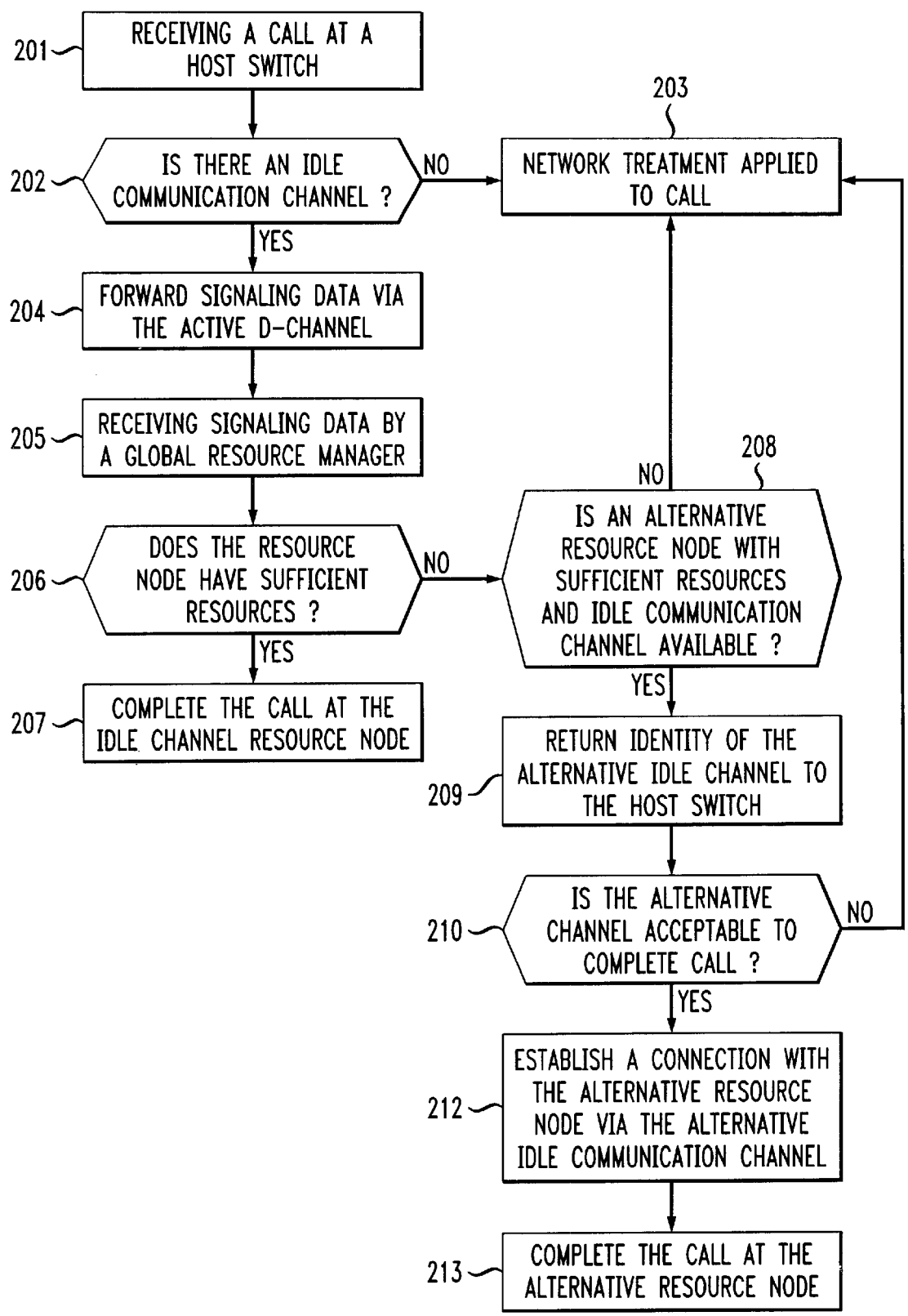
FIG. 2 is a flow chart relating to an embodiment of the present invention.

FIG. 2 is a flow diagram relating to an embodiment of the present invention. In step 201, a host switch receives an incoming call from a user that is destined for the application platform. The host switch determines whether an idle communication channel is available to complete the call, as shown in step 202. If an idle communication channel is not available, as shown in step 203, the network may provide some kind of call treatment on its own, such as dropping the call, routing the call without providing service features, or sending the call to another application platform elsewhere. If, however, an idle communication channel is available, the host switch may forward signaling data via the active D-channel or signaling channel to the application platform, as shown in step 204. As indicated in steps 205 and 206, upon receiving the signaling data, a GRM such as the GRM 110-2a of FIG. 1, located in the application platform determines whether the idle channel resource node has sufficient resources to complete the call. If the GRM determines that the idle channel resource node has sufficient resources to handle the call, the GRM causes completion of the call on the identified communication channel. Upon receiving this notification, the host switch completes the call at the idle channel resource node via the idle communication channel as shown in step 207. If, on the other hand, the idle channel resource node does not have sufficient resources to complete the call, the GRM may determine whether an alternative resource node with sufficient resources and an idle communication channel is available as illustrated in step 208. If such alternative resource node is not available, network call treatment as described above (for example, to drop or otherwise route the call) may be applied to the call as shown in step 203. If an alternative resource node is available, then the GRM may cause the return of the identity of the alternative idle communication channel to the host switch, as shown in step 209. The host switch determines whether the alternative idle channel is acceptable to complete the user's call, as shown in step 210. If the alternative idle communication channel is not acceptable, as shown in step 210, the network may provide some kind of call treatment on its own as shown in step 203 and as described above. If, however, the alternative idle channel is acceptable to the host switch, the host switch may establish a connection with the alternative resource node via the alternative idle communication channel, as indicated in steps 212. Finally, the user's call is completed at the alternative resource node located in the application platform as indicated in steps 213.

Figure 3:
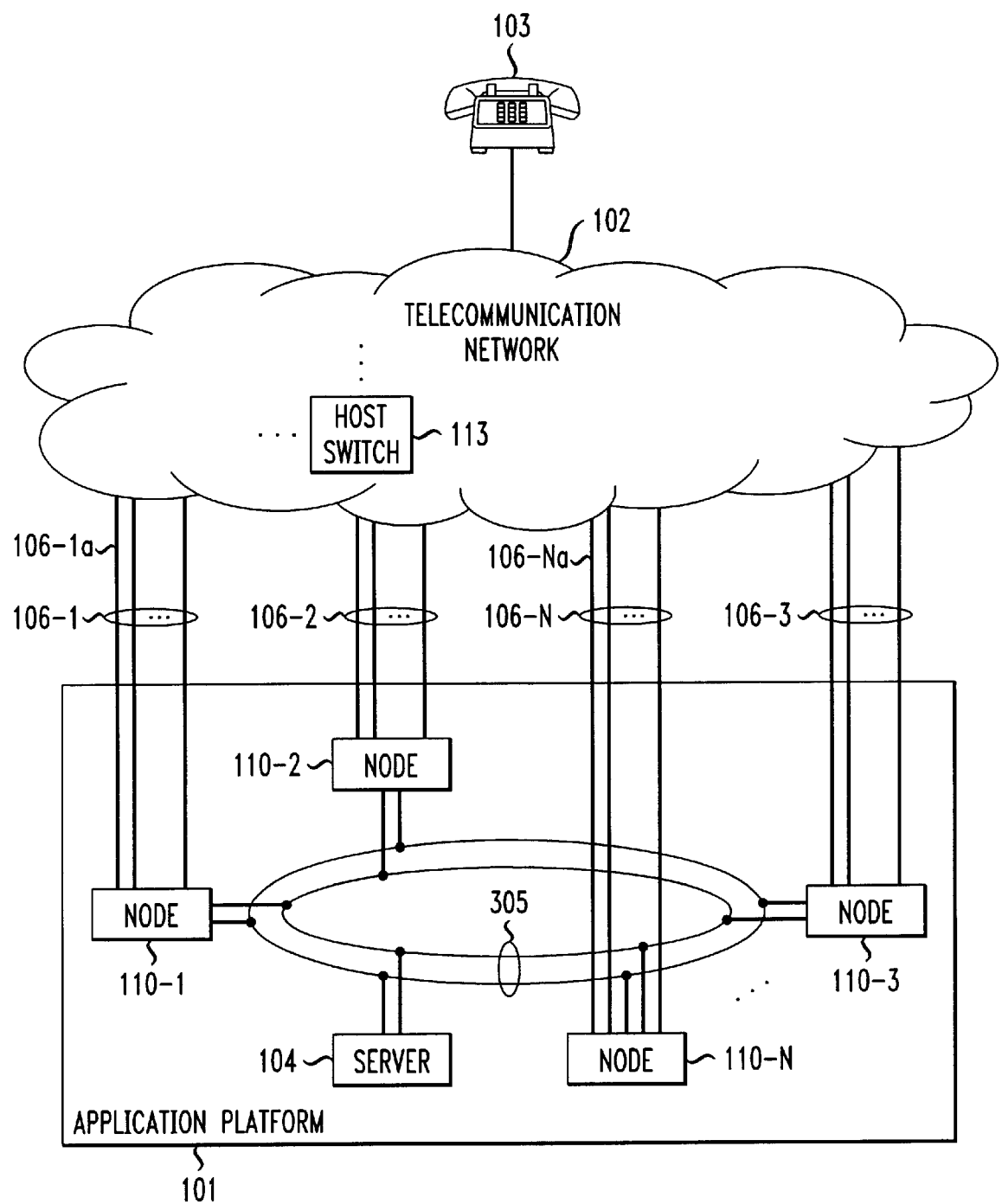
FIG. 3 illustrates another example of a telecommunication application platform under embodiments of the present invention.

FIG. 3 illustrates an alternative embodiment of the present invention. As shown in FIG. 3, resource nodes 110 within the same NFAS arrangement may be configured to form a logical ring via LAN 305 in the telecommunication application platform 101. As described above, the host switch 113 may receive an incoming call from a user 103 that is destined for application platform 101. Upon receiving the ISDN set-up message, the D-channel node (for example, node 110-1) may forward the call set-up message to the idle channel node (for example, node 110-2). Thus, when the idle channel node 110-2 receives the call set-up message from the D-channel node 110-1, the idle channel node 110-2 may classify the call and determine whether it has sufficient system resources available to process the call. If the idle channel node 110-2 determines that it has sufficient system resources to process the call, the idle channel node 110-2 may accept and complete the call.

If the idle channel node 110-2 does not have sufficient system resources available to process the call, under embodiments of the present invention, the telecommunication application platform 101 may initiate a resource hunting procedure. Accordingly, node 110-2 may instead forward the signaling data and possibly call classification to a neighboring resource node. The neighboring resource node may be a logically adjacent resource node in the clockwise direction (for example, node 110-3). In the alternative, the neighboring resource node may be the logically adjacent node in the counter-clockwise direction (for example, node 110-1). By "logically adjacent," is not meant physically adjacent in the sense that a table at a node or table for a ring may indicate the logically next node to attempt. The direction for forwarding the signaling data may be based on a predetermined direction or in the alternative, may be determined by the application platform 101 based on incoming communication traffic considerations and/or resource availability. In a path around one ring, a reverse direction may be utilized in another ring. For example, if the application platform 101 is receiving a large amount of communication traffic, the resource node may determine, based on traffic patterns, the desirable direction(s) for forwarding the signaling data. For purposes of illustration only, the idle channel node 110-2 forwards the signaling data to adjacent node 110-3, which is the logically adjacent node in the clockwise direction. (The process continues until it is becomes necessary to attempt a logically adjacent node that has already been attempted.)

When the logically adjacent resource node 110-3 receives the signaling data from node 110-2, node 110-3 determines whether it has sufficient system resources and an alternative idle communication channel to process the user's call. If node 110-3 has sufficient system resources and the alternative idle channel 106-3 for processing the call, resource node 110-3 causes the call to be completed on node 110-3 using the channel negotiation procedures with the host switch 113, as described above.

If the alternative idle channel 106-3 is acceptable to host switch 113, the host switch 113 establishes a connection with the logically adjacent resource node 110-3 via the alternative idle channel 106-3. Accordingly, the call is completed at the logically adjacent resource node 110-3 via its alternative idle channel 106-3.

If the alternative idle channel 106-3 is not acceptable to the host 113, as described above, the network 102 may provide some kind of call treatment on its own, such as dropping the call, routing the call without providing service features, or sending the call to another application platform elsewhere.

Referring again to FIG. 3, if, however, the logically adjacent resource node 110-3 does not have sufficient system resources or an alternative idle communication channel available to process the call, under embodiments of the present invention, the telecommunication application platform 101 continues the resource hunting procedure described above. Accordingly, node 110-3 forwards the signaling data to the next logically adjacent resource node. The next adjacent resource node may preferably be the next logically adjacent node in the earlier indicated clockwise direction. (In an alternative embodiment, a node may pass the call to a physically or logically non-adjacent node according to a prearranged plan or other arrangement that may come to mind of one of ordinary skill in the art for a particular application in a network that has nothing to do with a direction around a ring). The next logically adjacent node may be, for example, resource node 110-N. Upon receiving the signaling data and possibly call classification, the next adjacent node 110-N determines whether it has sufficient resources and a next alternative idle communication channel to process the call. The resource node hunting procedure may propagate along the logical ring until a suitable resource node is found to have sufficient resources and an idle communication channel to complete the call. When such a node is found, that resource node may accept the call and process it appropriately. In alternative embodiments, the above-described resource hunting procedure may continue until a forwarding limit has been reached. The forwarding limit may include, for example, making a full circle (i.e., reaching the idle channel node 110-2) without finding a suitable node to process the call. In this event, the network may apply the appropriate call treatment. In yet other embodiments, the forwarding limit may be reached when a predetermined number of nodes have been traversed and/or a predetermined amount of time has elapsed without finding a suitable node to process the call. Thus, if a forwarding limit has been reached without finding a suitable resource node to complete and process the call, the call may be rejected.

Figure 4:
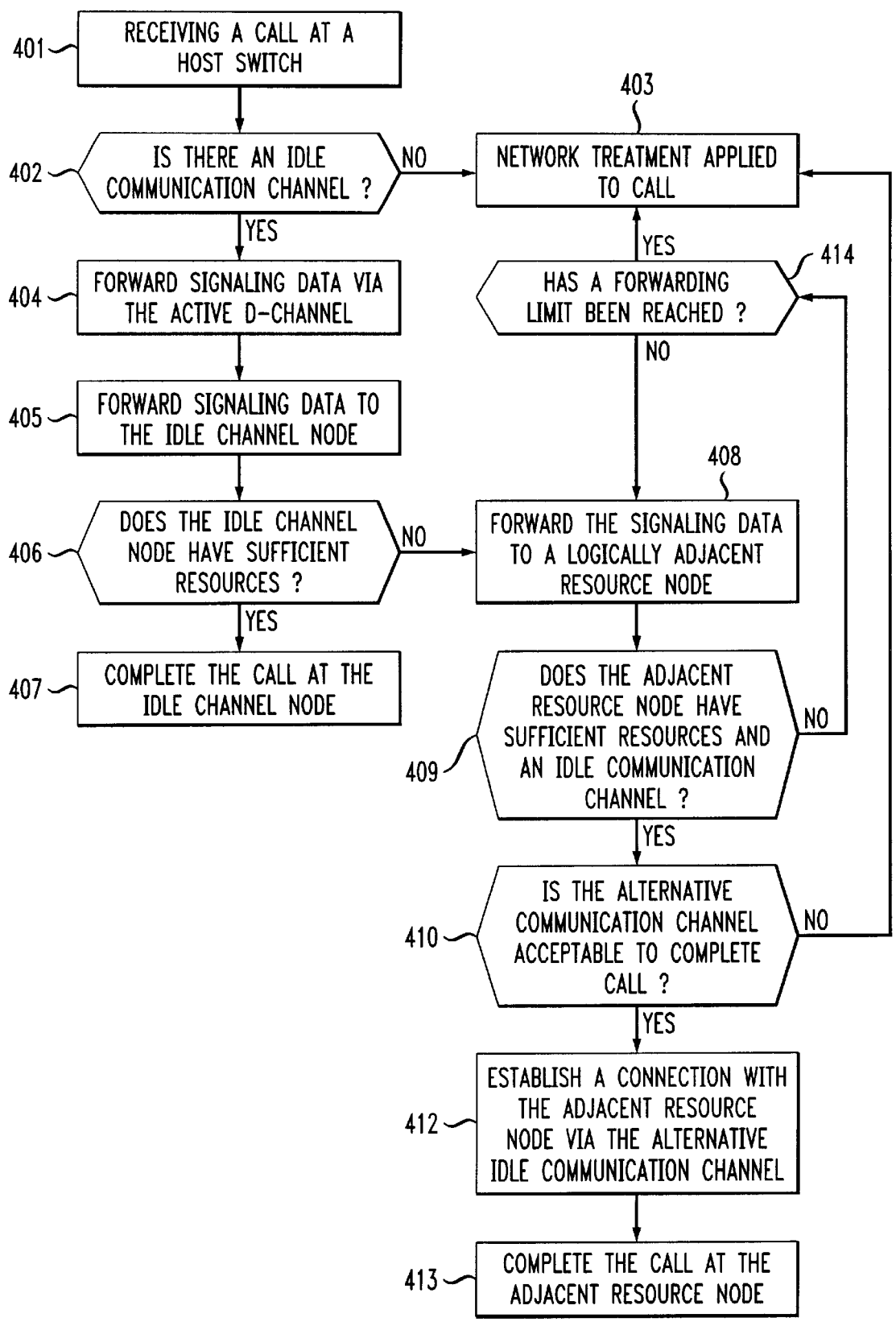
FIG. 4 is a flow chart relating to another embodiment of the present invention.
Figure 5:
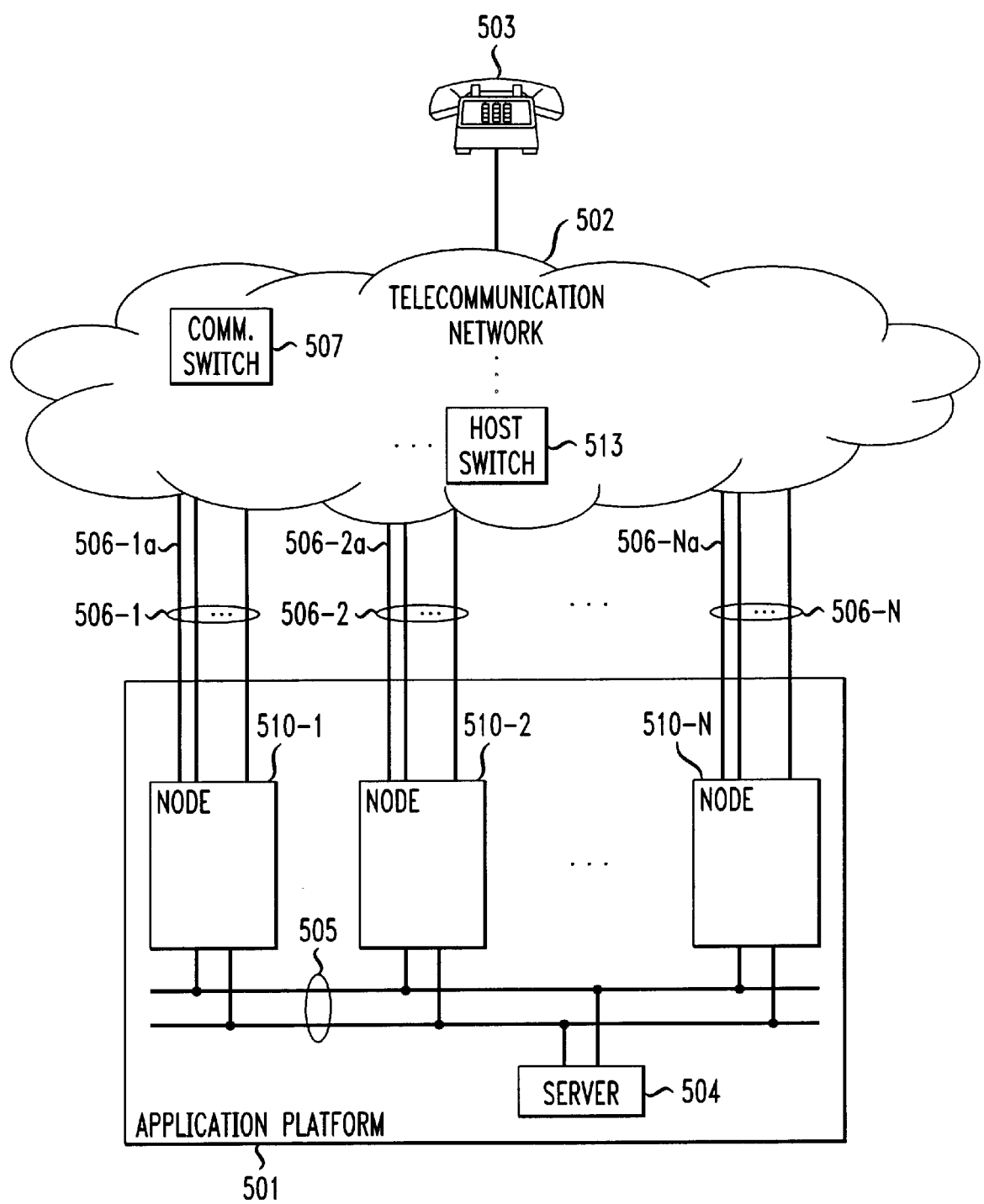
FIG. 5 is an illustration of a prior art system for processing calls.

FIG. 4 is a flow diagram relating to another embodiment of the present invention. In step 401, a host switch receives an incoming call from a user that is destined for the application platform. The host switch determines if an idle communication channel is available as shown in step 402. If the idle communication channel is not available, as shown in step 403, the network may provide some kind of call treatment as indicated earlier. If, however, an idle communication channel is available, the host switch may forward signaling data via the active D-channel as shown in step 404. Generally, the active D-Channel node receives and forwards the signaling data to the resource node connected to the idle channel node, as shown in step 405. As indicated in step 406, upon receiving the signaling data, the idle channel node determines whether it has sufficient resources to complete the user's call. If the idle channel node determines that it has sufficient system resources to process the call, the idle channel node accepts and completes the call, as illustrated in step 407.

If, on the other hand, the idle channel node determines that it does not have sufficient resources to complete the call, the idle channel node forwards the signaling data to a logically adjacent resource node, as shown in step 408. As shown in step 409, upon receiving the incoming signaling data, the adjacent node determines whether it has sufficient resources and an alternative idle communication channel to complete the call. If the adjacent node has the required resources and the alternative idle channel, the adjacent node causes that channel to be offered to the host switch. The host switch determines whether the alternative idle communication channel is acceptable to the host switch, as shown in step 410. If the alternative idle channel is not acceptable, as shown in step 403, the network provides some kind of call treatment, as shown in step 403. If, however, the alternative idle channel is acceptable to the host switch, the host switch may establish a connection with the logically adjacent resource node via the alternative idle channel, as indicated in steps 412. Finally, the user's call is completed at the logically adjacent resource node located in the application platform, as indicated in steps 413.

Referring again to FIG. 4, if the logically adjacent node determines in step 409 that it does not have the sufficient resources and an alternative communication channel, the adjacent node determines whether a forwarding limit has been reached as shown in step 414. If the forwarding limit has been reached, the platform rejects the call. The network receives a release message from the platform and, as shown in step 403, the network may provide the appropriate call treatment to the call. If, however, the forwarding limit has not been reached in step 414, under embodiments of the present invention, the resource hunting procedure continues by going to step 408 until a suitable node is found to complete the call or until the forwarding limit has been reached.

Embodiments of the present invention may not specifically rely on the ISDN PRI and/or related NFAS or channel negotiation capabilities. Embodiments of the present invention may, in the alternative, utilize any suitable switch-platform interface that permits the application platform to propose a single alternative communications channel or group of candidate communications channels across resource nodes, and for the switch to then deliver the call on (one of) the indicated bearer channels(s).

Embodiments of the present invention may permit different calls requiring different resources to be processed by the plurality of resource nodes. Where different resources are required, each new call may be classified according to the resources needed based on, e.g., calling and/or called party number. The telecommunication application platform described above may also interface with other devices over communications networks for purposes of distributed service processing or data acquisition.

The above description and accompanying drawings describe several embodiments of the present invention in detail. It is to be understood, however, that the invention is not limited to these illustrative embodiments. Various changes and modifications may be made therein by one skilled in the art without departing from the true spirit and full scope of the invention as defined in the attached claims.

We claim:

1. A method for allocating resources among a plurality of nodes including resource nodes at a telecommunication application platform, the method comprising the steps of:

connecting the resource nodes to a telecommunication network via a plurality of communications channels and at least one active signaling channel for transporting signaling data;

receiving a call in the telecommunication network;

determining if an idle communication channel is available for communications with the platform, the idle communication channel being connected to one of the resource nodes;

when the idle communication channel is available, forwarding signaling data including at least a call set-up message via the active signaling channel to one of the resource nodes; and upon receiving the call set-up message, determining at one of the resource nodes whether sufficient resources are available to complete the call at the resource node connected to the idle communication channel.

2. The method as recited in claim 1, further comprising the step of:

completing the call at the node connected to the idle communication channel when sufficient resources are available.

3. The method as recited in claim 1, further comprising the steps of:

identifying an alternative resource node for completing the call when sufficient resources at the node connected to the idle communication channel are not available; and redirecting the call to the alternative resource node identified to complete the call.

4. The method as recited in claim 3, the redirecting step comprising the steps of:

returning reply signaling data to a switch of the telecommunication network via the active signaling channel, the reply signaling data including a channel identifier of an alternative idle communication channel connected to the alternative node;

receiving the reply signaling data by the switch;

determining whether the alternative idle communication channel is acceptable to the switch; and if the alternative idle communication channel is acceptable, completing the call at the alternative resource node.

5. The method as recited in claim 4, wherein the switch communicates with the telecommunication application platform using ISDN PRI signaling having NFAS and channel negotiation capabilities.

6. A method for allocating resources among a plurality of nodes including resource nodes at a telecommunication application platform, at least one resource node including a global resource manager connected to a telecommunication network via a plurality of communication channels, the method comprising:

receiving a call at a host switch in the telecommunications network, said host switch establishing a connection with the telecommunication application platform to complete the call;

identifying by the host switch an idle communication channel to complete the call;

forwarding signaling data by the host switch to the global resource manager when the idle channel has been identified, the signaling data comprising signaling message content containing an identifier for the idle communication channel;

receiving the signaling data by the global resource manager;

determining by the global resource manager whether the node connected to the idle channel has sufficient resources available to complete the call; and when sufficient resources are available, completing the call at the node connected to the idle channel.

7. The method as recited in claim 6, further comprising the steps of:

when sufficient resources are not available at the resource node connected to the idle channel, identifying by the global resource manager an alternative resource node having sufficient resources and an alternative communication channel to complete the call.

8. The method as recited in claim 7, further comprising the steps of:

the global resource manager returning signaling data including a reply message identifying the alternative communication channel to the host switch;

the host switch receiving the return signaling data;

the host switch determining whether the alternative communication channel is acceptable to complete the call; and the host switch redirecting the call to the alternative communication channel if the alternative communication channel is acceptable to the host switch.

9. The method as recited in claim 8, said redirecting step comprising:

establishing a connection to the alternative resource node via the alternative idle communication channel; and completing the call at the alternative resource node.

10. The method as recited in claim 5, further comprising the step of:

maintaining by the global resource manager a status table comprising node identification data and per-node resource availability information corresponding to the resource nodes.

11. The method as recited in claim 10, wherein said resource availability information comprises at least resource allocation data and communication channel status for the resource nodes.

12. The method as recited in claim 10, further comprising the step of:

periodically updating the status table as resources and communication channels are assigned and released.

13. The method as recited in claim 12, said updating step further comprising:

polling each of the resource nodes by the global resource manager to update the status table.

14. The method as recited in claim 12, further comprising the step of:

periodic reporting of resource information by each of the resource nodes to the global resource manager.

15. The method as recited in claim 12, further comprising the step of:

reporting back to the global resource manager by each of the resource nodes when resources become available to process the call.

16. The method as recited in claim 7, further comprising the step of:

classifying the call by the global resource manager based on the types of resources required to process the call.

17. The method as recited in claim 16, wherein the classifying step comprises classifying the call based on at least one of a calling party number, a called party number and an automatic number identification.

18. The method as recited in claim 16, further comprising the step of:

classifying the resource nodes based on available resource features.

19. The method as recited in claim 18, further comprising the step of:

matching call classification with resource node classification; and when a match is found, completing the call based on the match.

20. The method as recited in claim 6, further comprising the steps of:

connecting the plurality of nodes including the global resource manager via a local area network.

21. The method as recited in claim 6, the global resource manager residing in one of the plurality of nodes.

22. The method as recited in claim 6, wherein the call comprises a connection via an Internet.

23. The method as recited in claim 22 wherein the plurality of nodes including the resource nodes comprises a plurality of Internet servers.

24. The method as recited in claim 6, wherein the host switch communicates with the telecommunication application platform using ISDN PRI signaling having NFAS and channel negotiation capabilities.

25. A method for allocating resources among a plurality of nodes located in a telecommunication application platform, said nodes being connected in a logical ring via a local area network, the method comprising:

receiving at the telecommunication application platform signaling data from a telecommunication network, the signaling data identifying an idle communication channel;

forwarding the signaling data to a node having the idle communication channel;

determining by the node whether sufficient resources are available to process the user's call; and when sufficient resources are not available, initiating a resource hunting procedure to complete the user's call, said resource hunting procedure further comprising:

forwarding the signaling data to a logically adjacent node;

receiving the signaling data at the adjacent node;

determining by the adjacent node whether sufficient resources are available to process the user's call;

determining by the adjacent node whether an alternative idle communication channel is available at the adjacent node; and when the sufficient resources and the alternative idle channel are available at the adjacent node, initiating by the adjacent node channel negotiation procedures with the host switch and completing the user's call at the adjacent node.

26. The method as recited in claim 25, further comprising the step of:

completing the user's call at the node having the idle channel when sufficient resources are available at the node having the idle channel.

27. The method as recited in claim 25, wherein the step of initiating channel negotiation comprises:

causing return by the adjacent node reply signaling data including and identity of the alternative idle channel to the host switch;

based on the identity of the alternative idle channel, determining by the host switch whether the alternative idle channel is acceptable to complete the call; and when the alternative idle channel is not acceptable to the host switch, applying an appropriate call treatment by the host switch.

28. The method as recited in claim 27 further comprising the steps of:

when the alternative idle channel is acceptable to the host switch, establishing a connection over the alternative channel; and completing the user's call at the adjacent node.

29. The method as recited in claim 25 further comprising the steps of:

when one of sufficient resources and the alternative idle channel are not found, repeating the resource hunting procedure until sufficient resources and the alternative idle channel are found to complete the user's call.

30. The method as recited in claim 25 further comprising the steps of:

when one of sufficient resources and alternative idle channel are not found, repeating the resource hunting procedure until a predetermined number of nodes have been traversed.

31. The method as recited in claim 25 further comprising the steps when one of sufficient resources and the alternative idle channel are not found, repeating the resource hunting procedure until a predetermined time has elapsed.

32. The method as recited in claim 25, further comprising the steps of:

when one of sufficient resources and alternative idle channel are not found, repeating the resource hunting procedure until the preferred node is again reached.

33. The method as recited in claim 25, wherein the step of forwarding the signaling data to the adjacent node comprises:

forwarding the signaling data in the clockwise direction.

34. The method as recited in claim 25, wherein the step of forwarding the signaling data to the adjacent node comprises:

forwarding the signaling data in the counter clockwise direction.

35. The method as recited in claim 25, wherein the host switch communicates with the telecommunication application platform using ISDN PRI signaling having NFAS and channel negotiation capabilities.

* * * * *

UNITED STATES PATENT AND TRADEMARK OFFICE
CERTIFICATE OF CORRECTION

PATENT NO. : 6,542,600 B1  
DATED : April 1, 2003  
INVENTOR(S) : Gary Munson and Peter L. Ng Page 1 of 1

It is certified that error appears in the above-identified patent and that said Letters Patent is hereby corrected as shown below:

Title page,
Item [57], ABSTRACT,
Lines 8-9, "in the telecommunication network. The idle communication" is replaced with -- in the telecommunication network, the idle communication --

Column 15,
Line 21, "The method as recited in claim 5" is replaced with -- The method as recited in claim 6 --

Signed and Sealed this

Thirtieth Day of September, 2003

JAMES E. ROGAN
*Director of the United States Patent and Trademark Office*